United States Patent [19]

Heule

[11] Patent Number: 5,181,810

[45] Date of Patent: Jan. 26, 1993

[54] DEBURRING TOOL WITH CUTTING BLADE

[76] Inventor: Heinrich Heule, Kristallstrasse 6, Au, Switzerland

[21] Appl. No.: 713,724

[22] Filed: Jun. 11, 1991

Related U.S. Application Data

[63] Continuation of Ser. No. 437,936, Nov. 16, 1989, abandoned.

[30] Foreign Application Priority Data

Nov. 23, 1988 [DE] Fed. Rep. of Germany ....... 3839423
Oct. 2, 1989 [EP] European Pat. Off. ........... 89118358

[51] Int. Cl.$^5$ .............................................. B23B 51/10
[52] U.S. Cl. ................................. 408/147; 408/154; 408/714; 408/227
[58] Field of Search ............. 408/54, 83, 147–149, 408/173, 196, 223, 227, 713, 714, 154–156; 407/9, 116

[56] References Cited

U.S. PATENT DOCUMENTS

| | | | |
|---|---|---|---|
| 2,314,084 | 3/1943 | Fried | 408/147 |
| 3,973,861 | 8/1976 | Jussmuth | 408/227 |
| 4,140,432 | 2/1979 | Heule | 408/147 |
| 4,545,711 | 10/1985 | Pooley | 408/227 |
| 4,571,129 | 2/1986 | Strand | 408/54 |
| 4,690,595 | 9/1987 | Heule | 408/173 |
| 4,844,670 | 7/1989 | Heule | 408/227 |
| 4,971,483 | 11/1990 | Kress et al. | 407/116 X |

FOREIGN PATENT DOCUMENTS

| | | | |
|---|---|---|---|
| 2525872 | 12/1976 | Fed. Rep. of Germany | 408/154 |
| 2852209 | 11/1982 | Fed. Rep. of Germany | |
| 222124 | 10/1968 | U.S.S.R. | 408/147 |
| 700971 | 12/1953 | United Kingdom | 408/147 |

Primary Examiner—Steven C. Bishop
Attorney, Agent, or Firm—Brown, Martin, Haller & McClain

[57] ABSTRACT

A deburring tool has at least one cutting blade mounted in a guide recess of the tool for deburring and chamfering bores. The blade is of rectangular shape with forward, non-cutting end face and longitudinal side faces extending rearwardly from the end face. At least one side face has a non-cutting glide surface extending rearwardly from the end face at a first angle, and a cutting edge extending rearwardly from the glide surface at a second, different angle.

11 Claims, 2 Drawing Sheets

DEBURRING TOOL WITH CUTTING BLADE

This is a continuation of application Ser. No. 07/437,936 filed Nov. 16, 1989, now abandoned.

BACKGROUND OF THE INVENTION

The invention involves a cutting tool for the deburring of bores and placing of chamfers at both ends of through bores with at least one cutting blade, consisting of a rectangular-edged cutting blade having tapering cutting edges which remove material from the bore. The cutting edges contain undercut, sharpened free spaces and the cutting blade has a bearing surface on its front end for setting inside the through hole.

Such cutting blades are known from the applicant's U.S. Pat. No. 4,140,432, the underlying problem of which is to precisely position a chamfer with an exactly defined size on both sides of the through hole.

Such cutting blades of this type, for removing burrs of through holes or placing of chamfers, are preferably used in pairs. In this case the cutting blades are installed in a rectangular reception slot in a rotary tool holder so as to face in opposite directions with radially, outward tilted, conical cutting edges.

The cutting blades are urged outwards via pins on a shaft by a spring inside the tool holder. The pins each engage a slot on the cutting blades.

The cutting blades are thus moveable radially in the same direction. In a resting, inoperative position the cutting blades are urged radially outward under spring tension. When operating to debur or chamfer the edges of a through hole, the cutting blades are progressively displaced radially inward against the spring tension until they finally reach the inside of the through hole in a non-cutting position within the tool holder. This is caused by the feed of the tool holder and the conical shape of the cutting edges which acts to progressively urge the blades inwards as the tool holder is fed into the bore.

The tool holder with the cutting blades is then driven through the through hole in order to work on the rear edge of the through hole with the feed working in reverse.

The cutting blades also have an additional cutting edge at the opposite end, so that the edge of the through hole can be deburred and chamfered from the rear also, after the through hole has been driven through and with the same cutting procedure but in the reverse feed direction.

However, it has not been possible to place chamfers very precisely with existing deburring and cutting tools, particularly in soft materials.

SUMMARY OF THE INVENTION

It is an object of this invention to further develop a deburring tool as described above so as to allow more accurate placement of chamfers with a defined size, on the front as well as the rear of through holes.

Until now, it has not been possible to cut chamfers with a precisely defined size, in soft materials. Some soft materials, especially soft metals, such as sheet metal for deep drawing or forming, copper, gold, or other soft alloys are provided with through holes which make it very difficult to cut chamfers with precisely defined size in the through hole.

If the material is very soft the cutting blades of existing cutting tools work very aggressively and accordingly remove large shavings from the edges of a through hole, which is not desirable.

Only with a more refined control of the cutting tool feed along the direction of the through hole and a decrease in pressure of the cutting blades on the edges of the through hole has it been made possible to attempt to control the removal of metal and achieve cleaner and level chamfers.

The result was often inadequate. In particular it could not be guaranteed that both chamfers could be equal in form and condition.

According to the present invention, a deburring tool is provided with at least one cutting blade of generally rectangular cross-section, an outer non-cutting, radial contact surface at the outer, forward end of the blade, a non-cutting, glide surface on at least one side of the blade extending rearwardly at a first angle from the outer contact surface, and at least one cutting edge extending rearwardly from the glide surface at a second angle different from the first angle.

The focus of the invention is, therefore, that the cutting edge does not extend immediately into the glide radius or contact surface on the front side of the cutting blade, but to provide a glide surface at an angle, between the glide radius and the cutting edge. This glide surface does not cut, it only glides.

Placing a glide surface between a cutting edge and a frontal glide radius has several advantages.

It is now possible, for the first time, especially in soft materials, to form precisely defined chamfer sizes reproducibly to a tolerance of plus/minus 0.0005 mm.

Depth of cut, angle and form of chamfer are evidently determined by the combination of the cutting edge and the glide plane extending radially outward from the cutting edge.

When positioning the cutting tool inside the through hole the cutting edges first touch the upper edge of the through hole and remove material. In this procedure, after a predetermined depth of cut, controlled by the transition from the cutting edge to the angled, non-cutting glide surface, the cutting edges are automatically disengaged from the bore and are held away from the walls of the bore as the tool holder travels on through.

The cutting edge is preferably at a fixed 90° angle to the outer end face or feed direction, while the glide surface is at a smaller angle. In this case, the smaller angle of the glide surface determines the angle of the chamfer to the horizontal axis of the through hole and thus the removal of material proceeds at a right angle to the direction of cut.

Since the distance from the outer end of the blade to the transition to the cutting edge exactly sets the desired diameter of cut, the cutting edges of the opposite cutting blades arranged on the tool head make the cut accurate in size. Hence the chamfer is precisely defined. If the tool then proceeds further into the through hole in the feed direction no additional material will be removed.

The glide surface and the adjoining glide radius on the front side of each blade lying against the wall of the through hole hold the blades in the through bore of the tool head under spring tension which urges the blades radially outward.

A further feed of the cutting tool lets the tool head protrude at the opposite end of the through bore in the material to be worked, and the same procedure as described before is repeated, but in reverse feed direction. This means that when the tool head protrudes through the through hole, the cutting blades are urged outwardly under spring tension into their extended initial position. As the tool head is moved back into the bore in a reverse direction, a cut is made into the rear of the material by means of a matching cutting edge and glide surface on the opposite side of the blades which match the corresponding edges on the first side of the blades.

Hence the focus of the invention is a combination of an existing cutting edge and an adjoining glide or sliding surface which extends between the cutting edge and the glide radius or contact face on the front side of the blade. The glide surface does not itself act as a cutter.

The cutting blade is integrated in the tool head and is preferably provided with opposing pairs of gliding non-cutting surfaces and cutting edges on the upper and lower sides of each blade set to the desired angle of cut. The cutting edge of this blade may be at an angle from about 45° to 90° and the glide surface is at an angle of about 40° to the longitudinal axis or feed direction of the tool head, in a preferred design.

An angle difference of around 5° is preferred, because it allows for easy grinding of the cutting edge without interfering with the glide surface. It also gives the glide surface a well defined conical form and thus makes it easier to place the cutting blades into the through hole. A preferred design of this invention provides a cutting edge which removes the material at a right angle to the feed direction of the tool. In this case, the angle of the chamfer to be cut with respect to the horizontal axis of the through hole and the chamfer's form are solely determined by the alignment of the glide surface to the vertical axis, or by the shaping of the glide surface. The glide surface, lying against the formed chamfer, pushes the spring-loaded blade as the tool head feeds it through the bore.

The design of such a blade provides the arrangement of the cutting edge of the cutting blade which is at a right angle to the direction of cut at a 90° angle and the arrangement of the glide surface in any other smaller angle with respect to the vertical axis. The glide surface can be straight, concave, convex or curved irregularly.

BRIEF DESCRIPTION OF THE DRAWINGS

The invention will be better understood from the following detailed description of a preferred embodiment of the invention, taken in conjunction with the accompanying drawings, in which like reference numerals refer to like parts, and in which.

DETAILED DESCRIPTION OF THE PREFERRED EMBODIMENT

Figure 2:
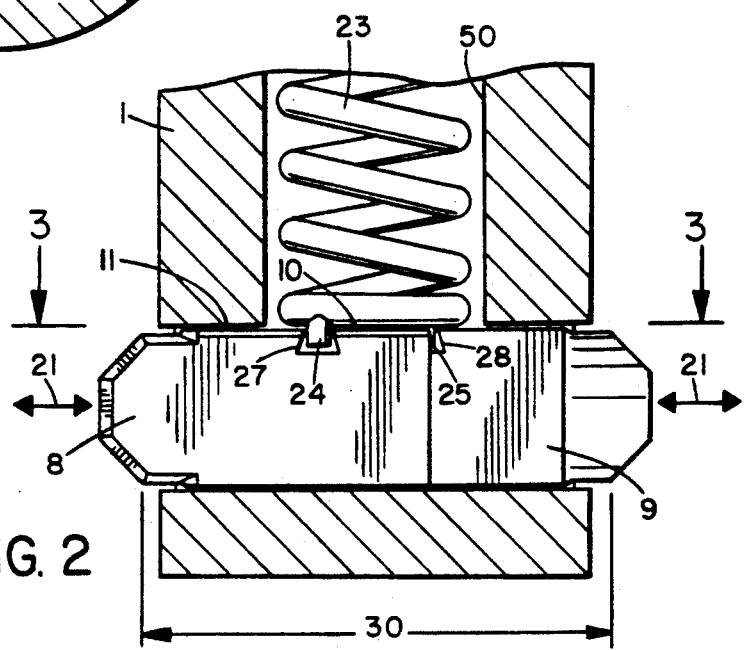
FIG. 2 illustrates a deburring tool according to a preferred embodiment of the invention in an operating position, with sharpened cutting blades as illustrated in FIG. 1.

FIG. 2 illustrates a cutting tool having a tool head 1 similar to that described in U.S. Pat. No. 4,140,432 of the same applicant. The tool head has a transverse through bore 11, and opposing cutting blades 8, 9 according to a preferred embodiment of this invention are mounted for sliding movement in opposite axial directions into and out of bore 11, as indicated by the arrows 21 in FIG. 2.

Figure 3:
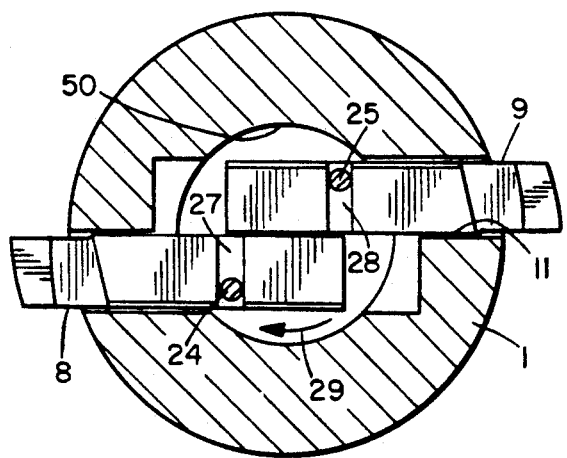
FIG. 3 is a cross-section along lines 3—3 of FIG. 2 with an additional depiction of a pressure point screw.

As illustrated in FIGS. 2 and 3, the cutting blades 8, 9 are biased outwardly in direction of arrows 21 by a compression or torsion spring 23 in central axial bore 50 of tool head 1.

The spring has a pair of pins 24, 25 which project from its lower end and engage in transverse slots 27, 28 in the respective cutting blade. Thus, rotation of the spring in the direction of arrow 29 in FIG. 3 will urge the blades outwardly. When the blades are pushed inwardly, the spring will be rotated in the opposite direction and will be compressed or loaded. An eccentric stop or screw 26 projects into bore 50 to engage and stop one of the pins 24 in a predetermined position, to control the distance the cutting blades move outwardly from bore 11. This distance can be varied by adjusting the screw inwardly or outwardly, controlling the diameter 30 of the cut (see FIG. 2).

FIGS. 2 to 7 illustrate one of the cutting blades according to a preferred embodiment of the invention. For reasons of simplicity, only one cutting blade is illustrated in FIGS. 4 to 7, because the opposite cutting blade is identical.

It is naturally possible to only use one cutting blade in a cutting tool.

Each cutting blade 8, 9 has an upper and lower horizontal bearing surface 10, which slide between corresponding upper and lower horizontal surfaces of through bore 11 with little tolerance. Upper and lower cutting edges 13 are formed adjoining the outermost edge of each bearing surface 10. Each blade has a glide surface 20 at its outer end which is substantially parallel to the feed direction of the tool head and which is a sliding, non-cutting face. An additional non-cutting glide surface 14 extends at an angle between end surface 20 and each cutting edge 13. The upper and lower cutting edges are symmetrical about the blade central axis.

In the illustrated embodiment, cutting edges 13 are horizontal, or at an angle of 90° to the vertical or feed direction 34 of the tool through bore 2. Glide surfaces 14 are at an angle 33 to the vertical. Cutting edges 13 may be at different angles in an alternative embodiment, but the angle 33 should be smaller than the angle of the cutting edge 13. This makes it convenient to sharpen the cutting edge 13 without damaging the glide plane 14, which can also reach a greater conicity. Consequently the cutting blades 8, 9 can be retracted more easily into the tool body through bore against the pressure of torsion spring urging them outwardly, when the cutting blades are positioned inside the through hole 2.

This design makes it possible to cut an accurately defined chamfer 4–7 of e.g. 12.4 mm diameter, with a defined angle of e.g. 45° and a through hole diameter 35 of e.g. 12 mm. This is possible due to the limitation of the rotation angle of the spring 23, which limits the outward movement of the cutting blades 8, 9.

The effect of the cutting edge 13 is exactly limited, because a non-cutting glide surface 14 extends from the front of the cutting edges and becomes a non-cutting glide radius 20.

The following is a more detailed description of the cutting blade.

The blade having horizontal cutting edges 13 perpendicular to the feed direction allows not only straight chamfers to be made with any possible angle to the horizontal axis of the through hole, but also allows chamfers to be cut which are curved, i.e. concave, convex or any other curved cut.

With this arrangement, the chamfer can now have almost any kind of shape, dependent on the shape of the glide surface 14. As mentioned above the glide surface can now be concave, convex or curved irregularly. The procedure is always started with a straight, horizontal cutting edge 13 and only the glide surface 14 (see FIGS. 5 and 7) is adjusted according to the desired form of the chamfer. The angle 33 and the shaping of the glide surface 14 consequently determine and define the angle of cut and the form of the chamfer in the case of this design of the cutting blade.

Figure 1:
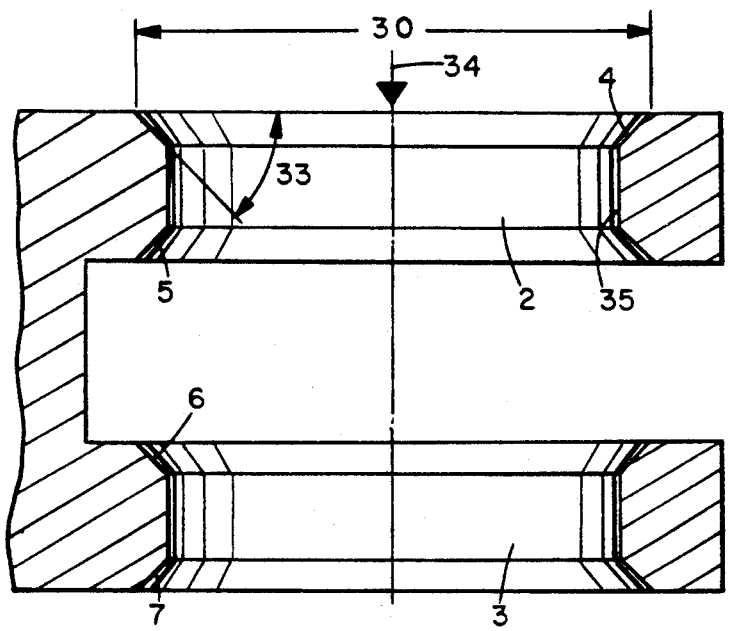
FIG. 1 is a cross-section of a double through hole which is to be burred or chamfered respectively, with a deburring tool.
Figure 5:
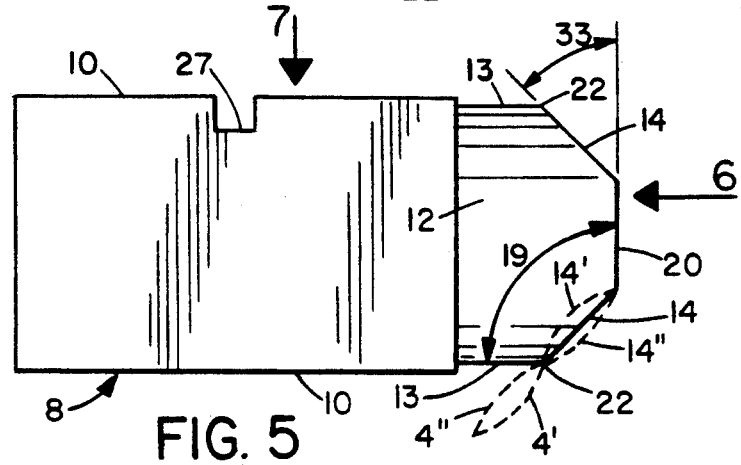
FIG. 5 is a side view of the cutting blade of FIGS. 2 to 4.

FIG. 5 demonstrates some alternative examples for the possibility of shaping of the glide surface plane 14. It is apparent that, apart from the straight glide surface 14, also a concave glide surface 14' or convex glide surface 14" could be provided. This would allow, instead of a straight chamfer 4 and 5 according to FIG. 1, for a curved chamfer 4' and 4" which is a mirror image of the respective glide surface 14', 14" on the workpiece, as illustrated by the interrupted lines 4' and 4" in FIG. 5.

Figure 8:
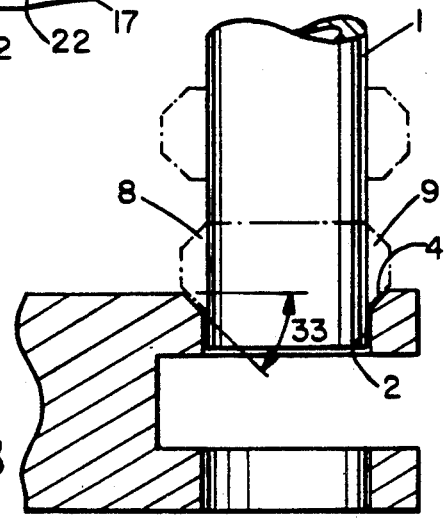
FIG. 8 illustrates a tool head with cutting blades of FIGS. 2 to 7 in an initial position at the start of a machining operation and in a position after the formation of a first chamfer.

This implies therefore that the chamfer 4, 5 is cut into the hole of the workpiece in a mirror image of the shaping of the glide surface 14 of the cutting blade 37, 38. In this case it is required that the cutting edge 13 be aligned horizontally or perpendicular to the feed direction or vertical 34 as shown in FIGS. 5 and 8.

However it is not mandatory for the cutting edge 13 to be aligned horizontally for this design of the invention. This cutting edge can be at any other angle to the horizontal; however, the angles must not deviate too far from the horizontal, otherwise the shape of the cutting edges themselves would control the shape of the chamfer.

It is therefore important that the cutting blade 37, 38 according to FIGS. 4 to 7 has an extending non-cutting glide surface, beginning from a horizontal cutting edge 13 and in a radially outward angle to the glide radius 20. This glide surface 14 can have any shape in a relatively wide range as exemplified by alternative glide surfaces 14' and 14" illustrated in FIG. 5.

As already mentioned, the glide surface 14 extends to the glide radius 20, which runs parallel to the vertical 34.

Figure 4:
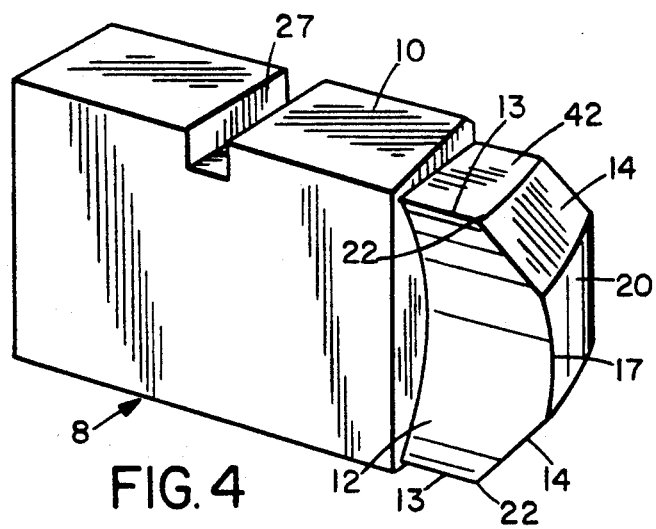
FIG. 4 is a perspective view of the cutting blade.
Figure 7:
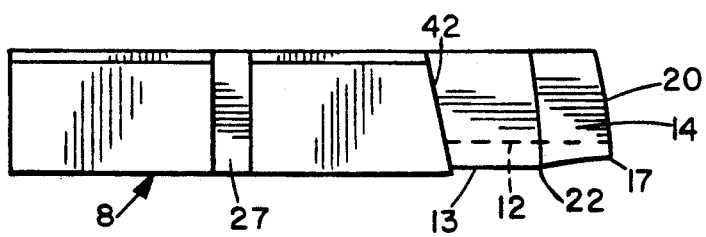
FIG. 7 is a top view of the cutting blade in FIG. 5 in direction of arrow 7 of FIG. 5.

It is apparent from FIGS. 4 and 7 that the transition from cutting edge 13 to the glide surface 14 is a curve at position 22 resulting in a curved chamfer.

The cutting edge shows a positive polished surface and hence a positive cut, whereas the glide surface 14, 14' and 14" has a negative polished surface in order to avoid a cutting effect.

Shavings groove or surface 12 extends between the upper and lower cutting edges 13 to carry away cut shavings from the cutting edges. The shaving groove edge 17 is curved to follow the line of a bow, with a curving radius which can be varied widely. The smaller the curving radius of this shaving groove 12 the sharper and more aggressive is the cutting effect of the cutting blade.

Figure 6:
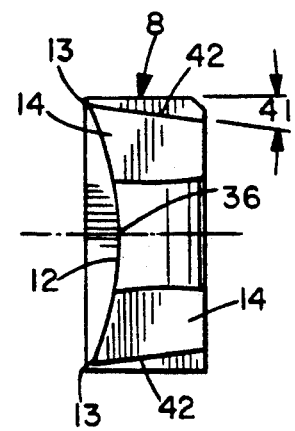
FIG. 6 is a view of the cutting blade in FIG. 5 in direction of arrow 6 of FIG. 5.

FIG. 6 also illustrates that a clearance angle edge 42 extends from the shaving groove 12, tilting forward on the front side of the cutting blade. This clearance angle edge shows an angle 41 to the horizontal.

FIG. 8 illustrates the operation of this cutting blade to remove material from a bore. In particular, a horizontal cutting effect is obtained with the cutting edge 13 in the cutting plane; in this procedure, as mentioned above, the shaping of the chamfer can be curved to any degree, which in turn depends on the shape of the glide surface 14. As the cutting tool is urged downwardly into through bore 2 of the workpiece, the cutting edges 13 first touch the upper edge of the through bore at the transition point 22 between edges 13 and glide surfaces 14. The removal of material then proceeds at a right angle to the direction of cut, with the shape and angle of cut 4 being determined by the shape and angle of glide surface 14. The blades are progressively urged back into the tool head as the tool head moves down into the bore. Once the transition point reaches the lower end of chamfer 4, the cutting edges are completely retracted and will be held away from the walls of bore 20 so that no further material can be removed. The maximum diameter 30 of the cut defines the transition 22 between the non-cutting glide surface and the cutting edge. The distance between end face 20 and transition point 22 controls the depth of the chamfer. After the chamfer is cut, the cutting edges are disengaged and retracted into the tool head, which continues on through the bore and out of its opposite end. The chamfer 5 is made in the same manner by reversing the direction of tool head 1 and moving it back upwardly through bore 2, with the uppermost cutting edges forming the chamfer.

Although a preferred embodiment of the invention has been described above by way of example only, it will be understood by those skilled in the field that modifications may be made to the disclosed embodiment without departing from the scope of the invention, which is defined by the appended claims.

I claim:

1. A deburring tool for removing burrs on through holes, comprising:
   at least one elongate cutter body of generally rectangular cross-section having a forward axial end;
   a rotatable tool holder mounted for movement in a tool feed direction and having a guide recess transverse to the feed direction for mounting said cutter body;
   the forward axial end of said cutter body comprising a non-cutting axial end surface extending generally perpendicular to said guide recess;
   said cutter body having a non-cutting, glide surface extending rearwardly at a first angle from said axial end surface, and at least one cutting edge extending rearwardly from the glide surface at a second, different angle relative to said axial end surface.

2. The tool as claimed in claim 1, wherein said cutter body has a cutting edge for cutting at a right angle to the direction of cutting, the cutting edge being generally perpendicular to said feed direction, and the glide surface being at an angle less than 90° to said feed direction.

3. The tool as claimed in claim 1, wherein the glide surface begins at an end of the cutting edge and extends in a straight line from said cutting edge up to the axial end surface of the cutter body.

4. The tool as claimed in claim 1, wherein said glide surface is non-flat.

5. The tool as claimed in claim 4, wherein said glide surface is concave.

6. The tool as claimed in claim 4, wherein said glide surface is convex.

7. The tool as claimed in claim 1, including a shaving groove adjacent said cutting edge having an inner edge of curved shape.

8. The tool as claimed in claim 1, wherein said cutter body has a pair of opposed cutting edges at said second angle and a non-cutting glide surface at said first angle extending from an end of each cutting edge up to said axial end face.

9. A cutting blade for the deburring of bores, comprising an elongate rectangular body having a forward end face perpendicular to the longitudinal axis of said body, and longitudinal side faces extending rearwardly from said forward end face, at least one of said side faces comprising a first, non-cutting glide surface extending from said forward end face at a first angle, and a second, cutting edge face extending rearwardly from the glide surface at a second angle relative to said forward end face, said second angle being different from the first angle.

10. The blade as claimed in claim 9, wherein the second angle is 90°.

11. The blade as claimed in claim 10, wherein the first angle is less than 90°.

* * * * *